US012793885B2

(12) United States Patent
Gul et al.

(10) Patent No.: US 12,793,885 B2
(45) Date of Patent: Nov. 10, 2026

(54) MAGNETIC ELEMENT AND ON-BOARD CHARGER USING THE SAME

(71) Applicant: Delta Electronics (Shanghai) Co., Ltd., Shanghai (CN)

(72) Inventors: Warda Gul, Shanghai (CN); Haijun Yang, Shanghai (CN); Zengyi Lu, Shanghai (CN); Jinfa Zhang, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 923 days.

(21) Appl. No.: 18/110,293

(22) Filed: Feb. 15, 2023

(65) Prior Publication Data

US 2023/0260692 A1 Aug. 17, 2023

(30) Foreign Application Priority Data

Feb. 16, 2022 (CN) ........................ 202210141141.X

(51) Int. Cl.

| | |
|---|---|
| ***H01F 27/24*** | (2006.01) |
| ***H01F 27/00*** | (2006.01) |
| ***H01F 27/28*** | (2006.01) |
| ***H01F 27/30*** | (2006.01) |
| ***H01F 38/14*** | (2006.01) |
| *H01F 27/08* | (2006.01) |

(52) U.S. Cl.

CPC ......... *H01F 27/306* (2013.01); *H01F 27/006* (2013.01); *H01F 27/24* (2013.01); *H01F 27/2876* (2013.01); *H01F 38/14* (2013.01); *H01F 27/08* (2013.01)

(58) Field of Classification Search

None

See application file for complete search history.

(56) References Cited

U.S. PATENT DOCUMENTS 6,927,661 B2 * 8/2005 He ...................... H01F 27/2804 336/200

8,004,380 B2 * 8/2011 Moiseev ................ H01F 27/38 336/83

(Continued)

FOREIGN PATENT DOCUMENTS

CN 201838440 U 5/2011

CN 102360794 A 2/2012

(Continued)

*Primary Examiner* — Mang Tin Bik Lian

(74) *Attorney, Agent, or Firm* — KIRTON McCONKIE; Evan R. Witt

(57) ABSTRACT

A magnetic element is provided and includes a magnetic core, M first and N second coil windings and an opening. The magnetic core includes a first and a second cover plates, a first and a second winding columns, a first and a second side columns. The M first and the N second coil windings are wound at intervals on the first winding column. The opening is disposed on the first or the second side columns, the opening penetrates through from a side of the first or second side columns away from the central connection line to a side (Continued)

of the first or the second side columns close to the central connection line. At least one coil winding of the M first and N second coil windings is wound on the first and second winding columns simultaneously.

17 Claims, 6 Drawing Sheets

(56) References Cited

U.S. PATENT DOCUMENTS

| | | | | |
|---|---|---|---|---|
| 8,947,190 | B2 * | 2/2015 | Park | H01F 27/00 336/212 |
| 2005/0068149 | A1 * | 3/2005 | Fushimi | H01F 27/306 336/208 |
| 2013/0099885 | A1 * | 4/2013 | Park | H01F 27/306 336/170 |
| 2013/0207766 | A1 * | 8/2013 | Kim | H01F 5/00 336/170 |
| 2016/0372250 | A1 * | 12/2016 | Chida | H01F 27/29 |
| 2017/0330678 | A1 * | 11/2017 | Harrison | H01F 3/10 |
| 2018/0350512 | A1 * | 12/2018 | Yang | H01F 27/22 |
| 2019/0164679 | A1 * | 5/2019 | Canete Cabeza | H01F 27/40 |
| 2021/0012943 | A1 * | 1/2021 | Ebner | H01F 27/26 |
| 2021/0110958 | A1 | 4/2021 | Liu et al. | |
| 2021/0358673 | A1 | 11/2021 | Lu et al. | |
| 2023/0048930 | A1 * | 2/2023 | Quinn | H01F 27/38 |
| 2023/0076761 | A1 * | 3/2023 | Kim | H01F 27/2871 |
| 2023/0197330 | A1 * | 6/2023 | Ebner | H01F 27/26 336/65 |

FOREIGN PATENT DOCUMENTS

| | | | |
|---|---|---|---|
| CN | 103985527 | A | 8/2014 |
| CN | 104966604 | A | 10/2015 |
| CN | 205104331 | U | 3/2016 |
| CN | 107275042 | A | 10/2017 |
| CN | 206619484 | U | 11/2017 |
| CN | 110739118 | A | 1/2020 |
| CN | 210805499 | U | 6/2020 |
| CN | 111462996 | A | 7/2020 |
| CN | 211670766 | U | 10/2020 |
| CN | 113035523 | A | 6/2021 |
| CN | 215342253 | U | 12/2021 |
| CN | 113889324 | A | 1/2022 |
| CN | 114050025 | A | 2/2022 |
| WO | 2019201302 | A1 | 10/2019 |

* cited by examiner

MAGNETIC ELEMENT AND ON-BOARD CHARGER USING THE SAME

CROSS-REFERENCE TO RELATED APPLICATION

This application claims priority to China Patent Application No. 202210141141.X, filed on Feb. 16, 2022, the entire contents of which are incorporated herein by reference for all purposes.

FIELD OF THE INVENTION

The present disclosure relates to a magnetic element and an on-board charger using the same, and more particularly to an integrated magnetic element and an on-board charger using the same.

BACKGROUND OF THE INVENTION

With the development of the on-board charger (OBC) technology, the demand for magnetic elements (including inductors and transformers) with high power density, high efficiency, efficient thermal dissipation, small volume and low cost in on-board chargers has become more urgent. Therefore, as the key component of OBC power supply, the continuous pursuit of the high performance requirement, the optimization of production process and the low cost for magnetic element have become a crucial development direction for OBC power supply.

Conventionally, the D2D (DC to DC) circuit of the OBC power supply may adopt LLC circuit, Boost SRC circuit, CLLLC circuit or CLLC circuit. The resonant tank of those circuits includes power magnetic elements, which generally adopt conventional separation components. That is, the resonant inductor and the transformer are designed separately and independently. The disadvantage of the conventional separation components design is that the material consumption of the magnetic core is relatively large, resulting in a large volume and high weight. Accordingly, it would be difficult to dissipate heat inside the magnetic element, and the manufacturing cost is relatively high. In order to reduce the volume and weight of the magnetic elements, an integrated multi-slot transformer may be adopted. Under this circumstance, the leakage inductance between the primary and secondary windings of the transformer is utilized as the resonant inductance, and the multi-slot transformer is packaged into a metal heat sink. However, it is difficult to reduce the distance between the primary and secondary windings, especially when the number of the winding turns is relatively small. In addition, the external magnetic flux leakage between the primary and secondary windings will cause additional losses on the metal heat sink. Therefore, it is necessary to provide additional shielding (such as magnetic shielding, copper foil shielding, etc.) or to increase the space distance appropriately, resulting in the complexity of design, and the production cost are increased.

Therefore, there is a need of providing a magnetic element and an on-board charger using the same to obviate the drawbacks encountered from the prior arts.

SUMMARY OF THE INVENTION

It is an object of the present disclosure to provide a magnetic element and an on-board charger using the same. In the integrated magnetic element of the present disclosure, at least one coil winding is wound on the first winding column and the second winding column simultaneously. The leakage inductance generated by the first coil winding and the second coil winding on the first winding column and the inductance generated by the first coil winding or the second coil winding on the second winding column are combined to form the required resonant inductance. Therefore, the overall volume and weight and the production cost of the magnetic element are reduced, and the power density of the magnetic element is improved.

It is another object of the present disclosure to provide a magnetic element and an on-board charger using the same. In the magnetic element, the opening is disposed on the first side column or the second side column. Therefore, the thermal dissipation medium (such as thermal dissipation glue) is filled in the gap between the first coil winding and the magnetic core and/or the gap between the second coil winding and the magnetic core through the opening, so as to improve the overall thermal dissipation performance of the magnetic element. In addition, the thermal dissipation medium (such as forced air or cooling liquid) may flow through the gap between the first coil winding and the magnetic core and/or the gap between the second coil winding and the magnetic core through the opening, thereby taking away the heat generated by the magnetic element. Furthermore, the first coil winding and the second coil winding are wound alternately with an interval along the axial direction on the first winding column, which simplifies the manufacturing process of the magnetic element. Moreover, the thermal dissipation glue is filled into the coil winding of the magnetic element through the interval between the first coil winding and the second coil winding, or the forced air or the cooling liquid may flow through the interval, which further enhances the thermal dissipation effect of the magnetic element.

In accordance with an aspect of the present disclosure, there is provided a magnetic element. The magnetic element includes a magnetic core, M first coil windings and N second coil windings and an opening, wherein M and N are positive integers. The magnetic core includes a first cover plate, a second cover plate, a first winding column, a second winding column, a first side column and a second side column. The first cover plate and the second cover plate are disposed opposite to each other. The first winding column and the second winding column are disposed between the first cover plate and the second cover plate. The first side column and the second side column are disposed between the first cover plate and the second cover plate and are disposed on two sides of a central connection line of the first winding column and the second winding column, respectively. The M first coil windings and the N second coil windings are wound at intervals on the first winding column. The opening is disposed on the first side column or the second side column, the opening penetrates through from a side of the first side column or the second side column away from the central connection line to a side of the first side column or the second side column close to the central connection line. At least one coil winding of the M first coil windings and N second coil windings is wound on the first winding column and the second winding column simultaneously.

In accordance with another aspect of the present disclosure, there provided an on-board charger including a case and a magnetic element. The case includes a thermal dissipation cavity, and the magnetic element is disposed in the thermal dissipation cavity. The magnetic element includes a magnetic core, M first coil windings and N second coil windings and an opening, wherein M and N are positive integers. The magnetic core includes a first cover plate, a second cover plate, a first winding column, a second winding column, a first side column and a second side column. The first cover plate and the second cover plate are disposed opposite to each other. The first winding column and the second winding column are disposed between the first cover plate and the second cover plate. The first side column and the second side column are disposed between the first cover plate and the second cover plate and are disposed on two sides of a central connection line of the first winding column and the second winding column, respectively. The M first coil windings and the N second coil windings are wound at intervals on the first winding column. The opening is disposed on the first side column or the second side column, the opening penetrates through from a side of the first side column or the second side column away from the central connection line to a side of the first side column or the second side column close to the central connection line. At least one coil winding of the M first coil windings and N second coil windings is wound on the first winding column and the second winding column simultaneously. A thermal dissipation glue is filled in a gap between the magnetic element and the thermal dissipation cavity.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
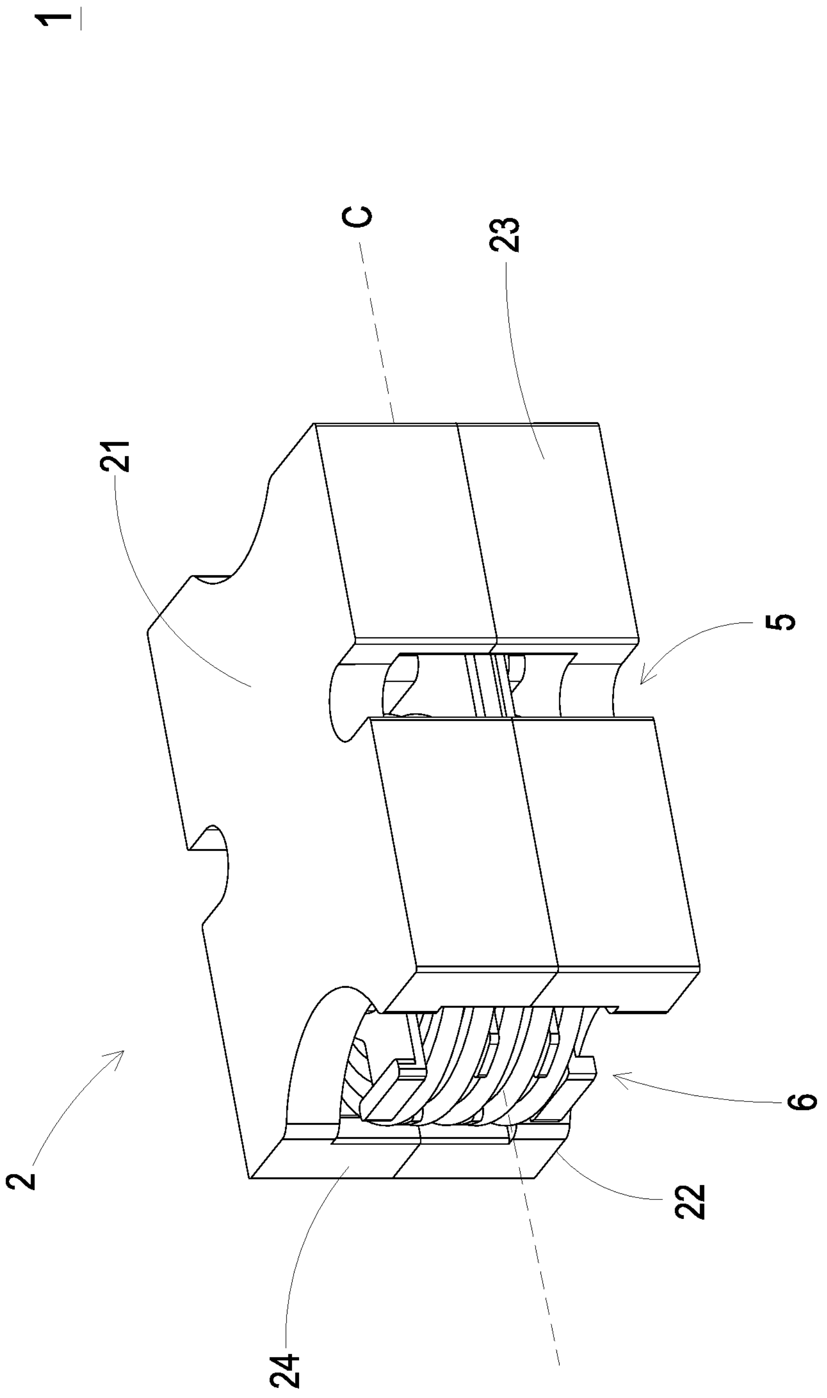
FIG. 1 is a three-dimensional structure view illustrating a magnetic element according to an embodiment of the present disclosure.
Figure 2:
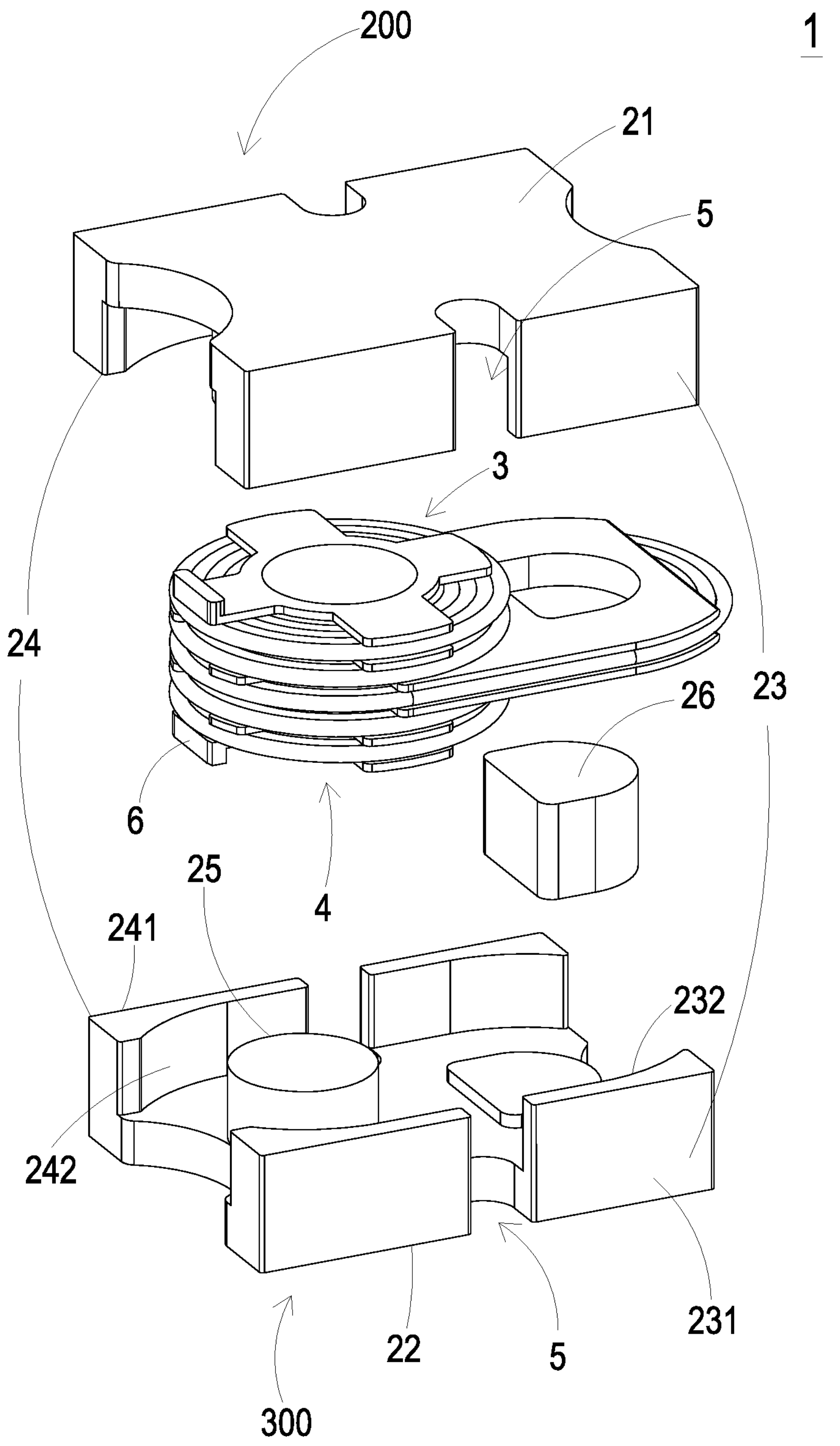
FIG. 2 is an exploded view illustrating the magnetic element of FIG. 1.

FIG. 1 is a three-dimensional structure view illustrating a magnetic element according to an embodiment of the present disclosure. FIG. 2 is an exploded view illustrating the magnetic element of FIG. 1. As shown in FIGS. 1 and 2, the magnetic element 1 of the present disclosure includes a magnetic core 2, M first coils 3, N second coils 4, an opening 5 and a bobbin 6, wherein M and N are positive integers. The magnetic core 2 includes a first cover plate 21, a second cover plate 22, a first side column 23, a second side column 24, a first winding column 25 and a second winding column 26. The first cover plate 21 and the second cover plate 22 are disposed opposite to each other. The first winding column 25 and the second winding column 26 are disposed between the first cover plate 21 and the second cover plate 22. A central connection line C passes through the center of the first winding column 25 and the center of the second winding column 26. The first side column 23 and the second side column 24 are disposed between the first cover plate 21 and the second cover plate 22 and are disposed on two sides of the central connection line C respectively. The M first coils 3 and the N second coils 4 are wound at intervals on the first winding column 25. At least one coil of the M first cols 3 and N second coils 4 is wound on the first winding column 25 and the second winding column 26 simultaneously. The opening 5 is disposed on the first side column 23 or the second side column 24, and the opening 5 penetrates through from the side of the first side column 23 or the second side column 24 away from the central connection line C to the side of the first side column 23 or the second side column 24 close to the central connection line C. Specifically, the opening 5 may penetrate through from the side 231 of the first side column 23 away from the central connection line C to the side 232 of the first side column 23 close to the central connection line C. The opening 5 may penetrate through from the side 241 of the second side column 24 away from the central connection line C to the side 242 of the second side column 24 close to the central connection line C. To improve the overall thermal dissipation performance of the magnetic element, a thermal dissipation medium 7 is further provided. In an embodiment, the thermal dissipation medium 7 is a forced air, a cooling liquid or a thermal dissipation glue. In an embodiment, the thermal dissipation glue is filled in the gap between the first coil 3 and the magnetic core 2 through the opening 5, and/or the thermal dissipation glue is filled in the gap between the second coil 4 and the magnetic core 2 through the opening 5. Therefore, a better thermal dissipation effect of the magnetic element 1 is achieved. In an embodiment, a forced air and a cooling liquid may flow through the gap between the first coil 3 and the magnetic core 2 and/or the gap between the second coil 4 and the magnetic core 2 through the opening 5. Therefore, the heat generated by the magnetic element 1 is taken away. Furthermore, in order to further improve the thermal dissipation effect of the magnetic element 1, the thermal dissipation glue may be filled in the gap between the first-con first coil 3 and the second coil 4, or the forced air or the cooling liquid may flow through the gap between the first coil 3 and the second coil 4.

In an embodiment, as shown in FIG. 2, the opening 5 may completely penetrate through the first side column 23 or the second side column 24 from the first cover plate 21 to the second cover plate 22. In an embodiment, the M first coils 3 are primary windings of a transformer, and the N second coils 4 are secondary windings of the transformer. In another embodiment, the M first coils 3 are secondary windings of a transformer, and the N second coils 4 are primary windings of the transformer. The part of the M first coils 3 and N second coils 4 wound on the second winding column 26 is an inductor winding. In an embodiment, the M and N second coils 4 are alternately wound on the first winding column 25 with an interval along the axial direction, wherein M is a positive integer and greater than 1, and the interval is between 0.1 and 2 mm. In the present disclosure, at least one coil winding is wound on the first winding column 25 and the second winding column 26 simultaneously, and the leakage inductance generated by the first coil 3 and the second coil 4 on the first winding column 25 and the inductance generated by the first coil 3 or the second coil 4 on the second winding column 26 are combined to form the required resonant inductance. Therefore, the overall volume and weight and the production cost of the magnetic element is reduced, and the power density of the magnetic element is improved.

As shown in FIG. 2, the first cover plate 21, a part of the first side column 23, a part of the first winding column 25 and a part of the second side column 24 form a first component 200. The second cover plate 22, the other part of the first side column 23, the other part of the first winding column 25 and the other part of the second side column 24 form a second component 300. The first component 200 and the second component 300 are assembled with each other to form the magnetic core 2. In an embodiment, the second cover plate 22 may be a flat plate, the first side column 23, the second side column 24 and the first winding column 25 are disposed on the first cover plate 21 respectively, and the first cover plate 21 and the second cover plate 22 are assembled with each other to form the magnetic core 2. In another embodiment, the first cover plate 21, the first side column 23, the second side column 24 and the first winding column 25 are integrally formed in one piece.

In an embodiment, the magnetic element 1 includes two openings 5 disposed on the first side column 23 and the second side column 24 respectively. The two openings 5 are symmetrically disposed relative to the central connection line C of the first winding column 25 and the second winding column 26. In an embodiment, the opening 5 is disposed on the first side column 23 or the second side column 24 corresponding to the gap between the first winding column 25 and the second winding column 26.

Figure 3:
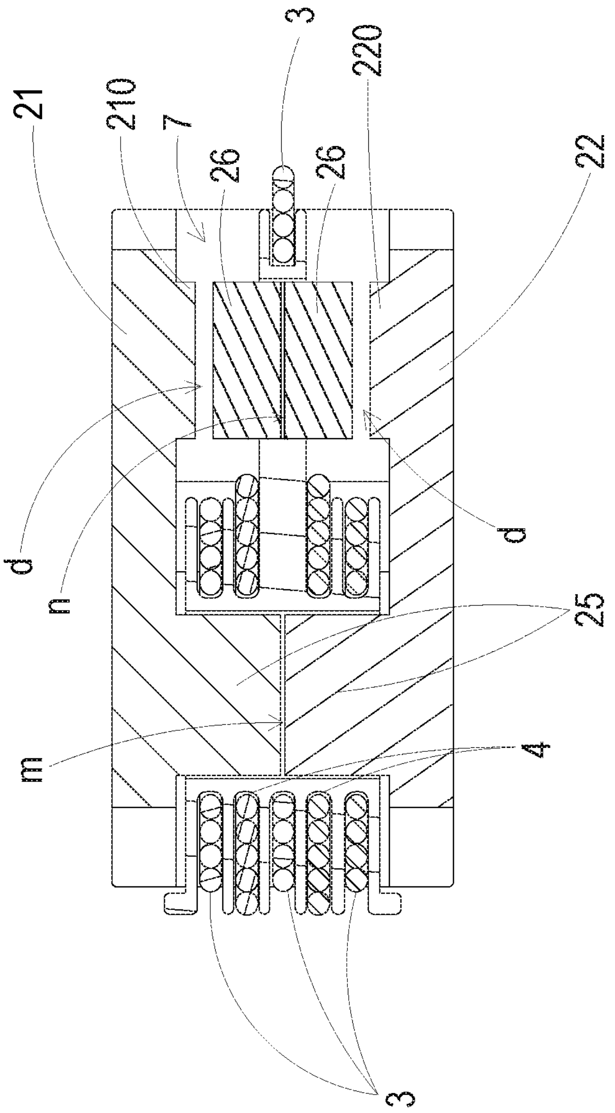
FIG. 3 is a schematic cross-sectional view illustrating the magnetic element of FIG. 1.

In an embodiment, there is an air-gap d between the second winding column 26 and the first cover plate 21 and/or between the second winding column 26 and the second cover plate 22. Please refer to FIG. 3, FIG. 3 is a schematic cross-sectional view illustrating the magnetic element of FIG. 1. As shown in FIG. 3, the first cover plate 21 has a first protruding part 210, and the second cover plate 22 has a second protruding part 220. The first protruding part 210 and the second protruding part 220 correspond to the second winding column 26 respectively. The gaps between the first and second protruding part 210, 220 and the second winding column 26 form the air-gaps d respectively. The air-gap d is used to adjust the inductance of the inductor winding wound on the second winding column 26, and the distributed air-gaps d can reduce the winding loss. In an embodiment, the first winding column 25 further includes an air-gap m, and it is understood that the second winding column 26 may also include an air-gap n, which is not limited in the present disclosure.

Please refer to FIG. 3 again. Each first coil 3 and each second coil 4 are wound perpendicular to the axial direction of the first winding column 25. The number of turns of each first coil 3 is for example but not limited to four, and the number of turns of each second coil 4 is for example but not limited to five. In the embodiment shown in FIG. 3, the magnetic element 1 includes three first coils 3 and two second coils 4, the number of turns of the first coil 3 is four, and the number of turns of the second coil 4 is five. One of the first coils 3 is wound on the first winding column 25 and the second winding column 26 simultaneously.

Figure 4:
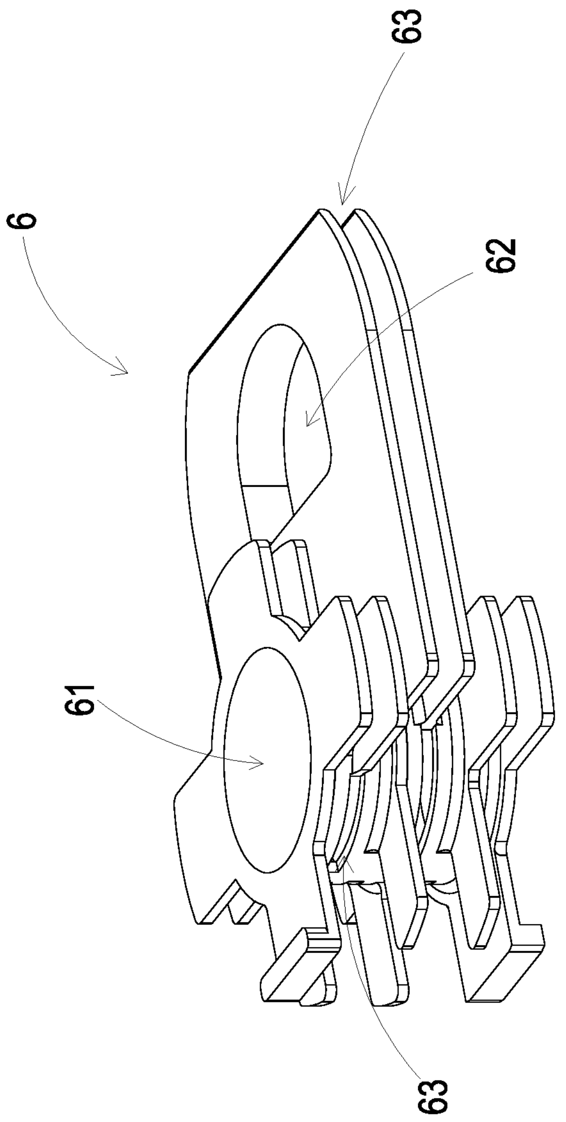
FIG. 4 is a three-dimensional structure view illustrating a bobbin of the magnetic element of FIG. 1.

Please refer to FIG. 4. FIG. 4 is a three-dimensional structure view illustrating a bobbin of the magnetic element of FIG. 1. As shown in FIG. 4, the bobbin 6 of the magnetic element 1 includes a first hollow sleeve 61, a second hollow sleeve 62 and M+N+X winding slots 63. The first winding column 25 is disposed in the first hollow sleeve 61, and the second winding column 26 is disposed in the second hollow sleeve 62. The M+N+X winding slots 63 are disposed on the first hollow sleeve 61 and the second hollow sleeve 62. The M+N winding slots 63 of the M+N+X winding slots 63 are disposed in sequence with intervals on the first hollow sleeve 61, and the M first coils 3 and the N second coils 4 are correspondingly accommodated in the M+N winding slots 63. The other X winding slots 63 of the M+N+X winding slots 63 are disposed on the second hollow sleeve 62. A part wound on the second winding column 26 in the coils that are simultaneously wound on the first winding column 25 and the second winding column 26 are accommodated in the X winding slots 63. It should be noted that, in the condition that a plurality of coils are simultaneously wound on the first winding column 25 and the second winding column 26, the plurality of coils are accommodated in the X winding slots 63 on the second winding column 26 respectively. It should also be noted that, on the condition that the bobbin 6 includes M+N+X winding slots 63, the bobbin 6 may further include other winding slots for accommodating other coils.

Figure 5:
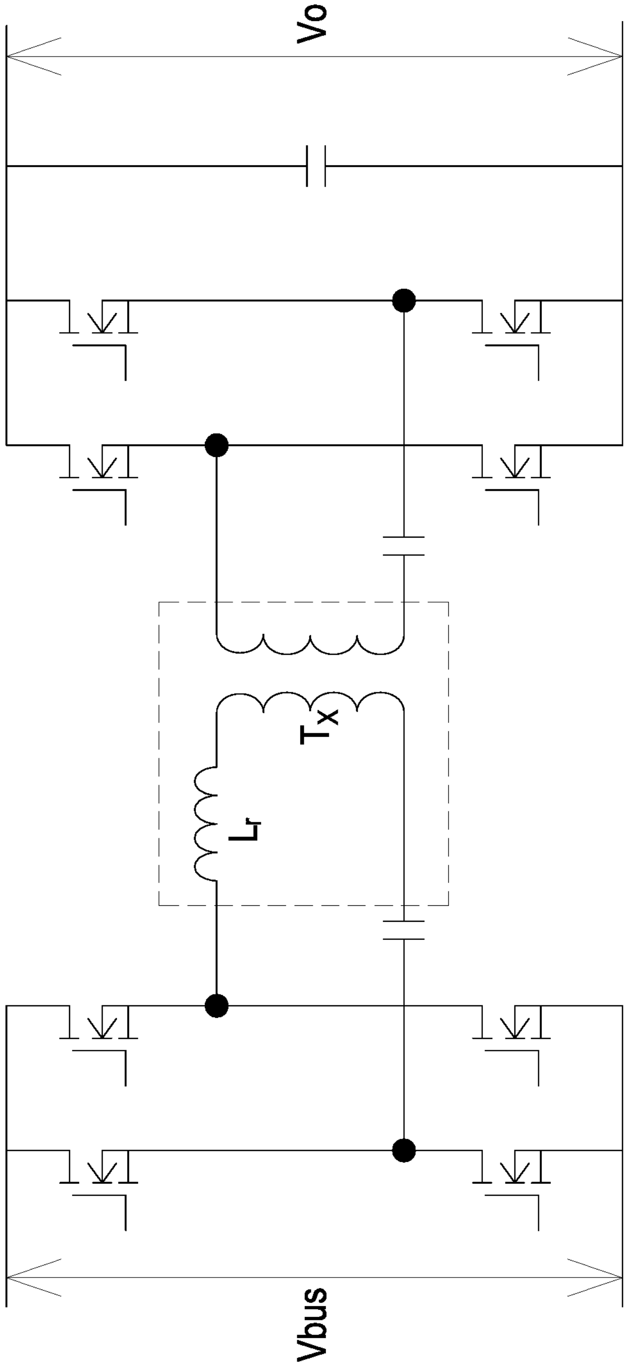
FIG. 5 is a schematic circuit diagram illustrating the magnetic element of FIG. 1 applied to a resonant circuit.

Please refer to FIG. 5. FIG. 5 is a schematic circuit diagram illustrating the magnetic element of FIG. 1 applied to LLC or Boost SRC resonant circuit, et al. The magnetic element 1 shown in FIG. 1 corresponds to the transformer Tx and the inductor Lr in the dashed frame shown in FIG. 5. The magnetic element 1 may also be applied to other circuit topologies, which is not limited in the present disclosure.

Figure 6:
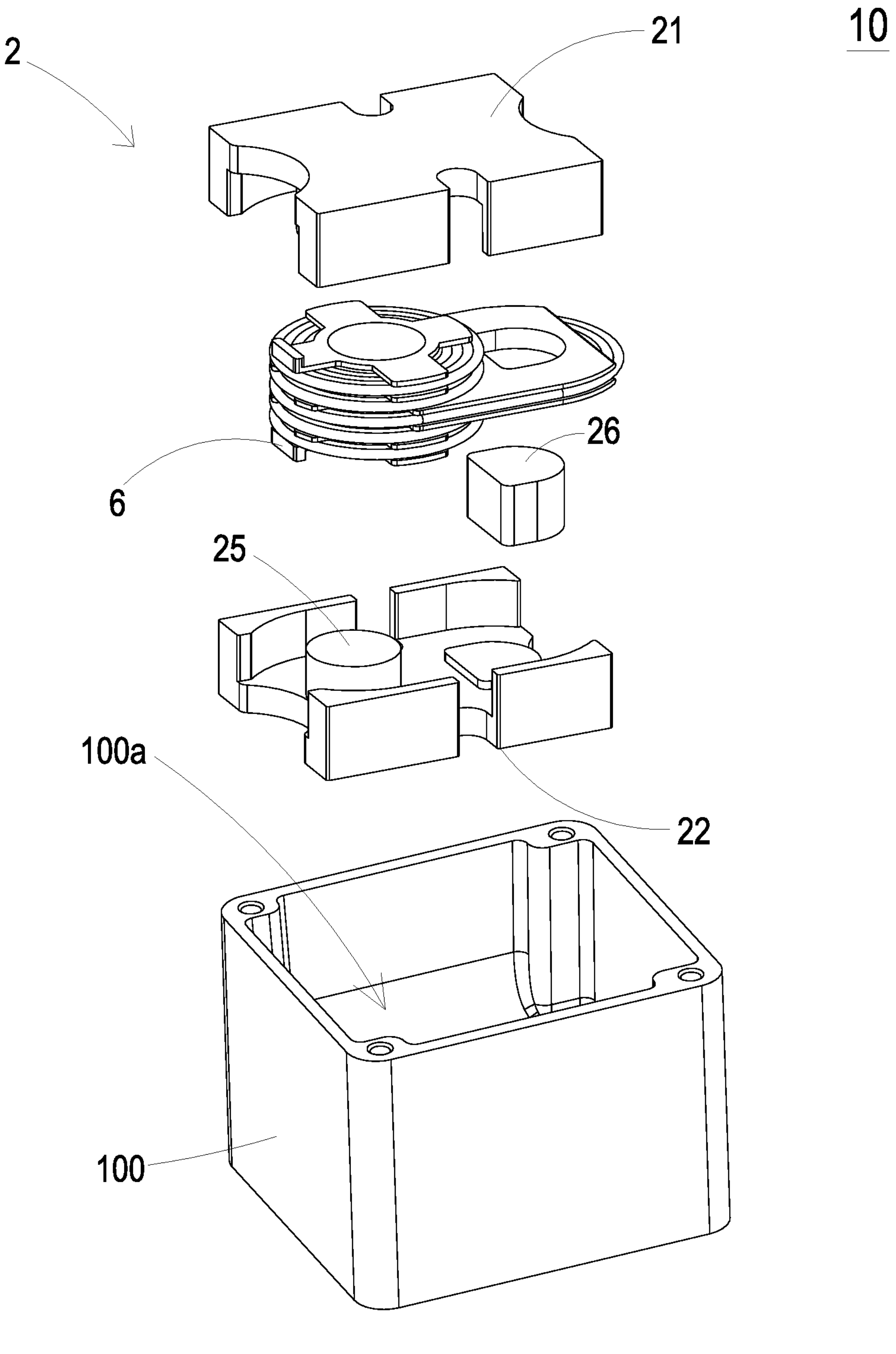
FIG. 6 is an exploded view illustrating a part of the components of an on-board charger according to an embodiment of the present disclosure.

FIG. 6 is an exploded view illustrating a part of the components of an on-board charger according to an embodiment of the present disclosure. As shown in FIG. 6, the on-board charger 10 includes a case 100 and the magnetic element 1 mentioned above, the structures of the magnetic element 1 and winding method of the windings are as described above, and the detailed descriptions thereof are omitted herein. The case 100 includes a thermal dissipation cavity 100*a*, the magnetic element 1 is disposed in the thermal dissipation cavity 100*a*, and a fluid (e.g., cooling liquid or thermal dissipation glue) is filled in the gap between the magnetic element 1 and the thermal dissipation cavity 100*a*.

From the above description, the present disclosure provides a magnetic element and an on-board charger using the same. In the magnetic core, at least one coil winding is wound on the first winding column and the second winding column simultaneously. The leakage inductance generated by the first coil winding and the second coil winding on the first winding column and the inductance generated by the first coil winding or the second coil winding on the second winding column are combined to form the required resonant inductance. Therefore, the overall volume and weight and the production cost of the magnetic element are reduced, and the power density of the magnetic element is improved. In addition, the winding losses is reduced due to the distributed air-gap between the second winding column and the cover plate. The magnetic element of the present disclosure further includes an opening disposed on the first side column or the second side column. Therefore, the thermal dissipation glue is filled in the gap between the first coil winding and the magnetic core and/or the gap between the second coil winding and the magnetic core through the opening, so as to improve the overall thermal dissipation performance of the magnetic element. In addition, the thermal dissipation medium (such as forced air or cooling liquid) may flow through the gap between the first coil winding and the magnetic core and/or the gap between the second coil winding and the magnetic core through the opening, thereby taking away the heat generated by the magnetic element. Furthermore, the M first coil windings and the N second coil windings wound alternately with an interval along the axial direction on the first winding column, which simplifies the manufacturing process of the magnetic element. Moreover, the thermal dissipation glue is filled into the coil winding of the magnetic element through the interval between the first coil winding and the second coil winding, or the forced air or the cooling liquid may flow through the interval between the first coil winding and the second coil winding, which further enhances the thermal dissipation effect of the magnetic element.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A magnetic element, comprising:

a magnetic core, comprising:

a first cover plate and a second cover plate, disposed opposite to each other;

a first winding column and a second winding column, disposed between the first cover plate and the second cover plate; and a first side column and a second side column, disposed between the first cover plate and the second cover plate, and disposed on two sides of a central connection line of the first winding column and the second winding column respectively;

M first coils and N second coils, wound at intervals on the first winding column, wherein each M and N is a positive integer; and at least one opening disposed on the first side column or the second side column, wherein the opening penetrates through from a side of the first side column or the second side column away from the central connection line to a side of the first side column or the second side column close to the central connection line, wherein at least one coil of the M first coils and/or the N second coils is wound on the first winding column and the second winding column simultaneously, wherein each of the M first coils and each of the N second coils are formed by conductive wires and are wound alternately on the first winding column in a single layer with an interval along an axial direction.

2. The magnetic element according to claim 1, wherein the at least one opening comprises two openings, and the two openings are disposed on the first side column and the second side column respectively.

3. The magnetic element according to claim 2, wherein the two openings are symmetrically disposed relative to the central connection line.

4. The magnetic element according to claim 1, wherein the at least one opening is disposed on the first side column or the second side column corresponding to a gap between the first winding column and the second winding column.

5. The magnetic element according to claim 1, wherein the at least one opening penetrates through the first side column or the second side column from the first cover plate to the second cover plate.

6. The magnetic element according to claim 1, wherein a thermal dissipation medium is flown through or is filled in a gap between the M first coils and the magnetic core and/or a gap between the N second coils and the magnetic core through the opening, wherein the thermal dissipation medium is a forced air, a cooling liquid or a thermal dissipation glue.

7. The magnetic element according to claim 1, wherein the first winding column or/and the second winding column comprise an air-gap.

8. The magnetic element according to claim 1, wherein there is an air-gap between the second winding column and the first or/and the second cover plate.

9. The magnetic element according to claim 8, wherein the first cover plate has a first protruding part, and the second cover plate has a second protruding part, the first protruding part and the second protruding part correspond to the second winding column respectively, and there is an air-gap between the first protruding part and the second winding column, and there is another air-gap between the second protruding part and the second winding column.

10. The magnetic element according to claim 1, wherein M is greater than 1.

11. The magnetic element according to claim 1, wherein the interval is between 0.1 and 2 mm.

12. The magnetic element according to claim 1, wherein the magnetic element comprises a bobbin, comprising:

a first hollow sleeve, wherein the first winding column is disposed in the first hollow sleeve;

a second hollow sleeve, wherein the second winding column is disposed in the second hollow sleeve; and M+N+X winding slots disposed on the first hollow sleeve and the second hollow sleeve, wherein M+N winding slots of the M+N+X winding slots are disposed in sequence with intervals on the first hollow sleeve, the M first coils and the N second coils are correspondingly accommodated in the M+N winding slots, the other X winding slots of the M+N+X winding slots are disposed on the second hollow sleeve, a part wound on the second winding column in the coils that are simultaneously wound on the first winding column and the second winding column are accommodated in the X winding slots, X is a positive integer.

13. The magnetic element according to claim 1, wherein each of the first coils and each of the second coils are wound perpendicular to the axial direction of the first winding column, wherein the number of turns of each of the first coils is four, and the number of turns of each of the second coils is five.

14. The magnetic element according to claim 1, wherein the M first coils are one of primary windings and secondary windings of a transformer, and the N second coils are the other of the primary windings and the secondary windings of the transformer.

15. The magnetic element according to claim 1, wherein a part of the at least one coil of the M first coils and/or the N second coils wound on the second winding column is an inductor winding.

16. The magnetic element according to claim 1, wherein the first cover plate, the first side column, the second side column and the first winding column are integrally formed.

17. An on-board charger, comprising a case and a magnetic element, wherein the magnetic element comprises:

a magnetic core, comprising:

a first cover plate and a second cover plate, disposed opposite to each other;

a first winding column and a second winding column, disposed between the first cover plate and the second cover plate; and a first side column and a second side column, disposed between the first cover plate and the second cover plate and are disposed on two sides of a central connection line of the first winding column and the second winding column, respectively;

M first coils and N second coils, wound at intervals on the first winding column, wherein each M and N is a positive integer; and at least one opening disposed on the first side column or the second side column, wherein the opening penetrates through from a side of the first side column or the second side column away from the central connection line to a side of the first side column or the second side column close to the central connection line, wherein at least one coil of the M first coils and/or the N second coils is wound on the first winding column and the second winding column simultaneously, wherein each of the M first coils and each of the N second coils are formed by conductive wires and are wound alternately on the first winding column in a single layer with an interval along an axial direction, wherein the case comprises a thermal dissipation cavity, and the magnetic element is disposed in the thermal dissipation cavity, and a thermal dissipation glue is filled in a gap between the magnetic element and the thermal dissipation cavity.

* * * * *